(12) United States Patent
van der Lende

(10) Patent No.: US 8,303,979 B2
(45) Date of Patent: Nov. 6, 2012

(54) DIETARY MODIFICATIONS TO IMPROVE FERTILITY

(75) Inventor: Tette van der Lende, Wageningen (NL)

(73) Assignee: Nutreco Nederland B.V., Boxmeer (NL)

( * ) Notice: Subject to any disclaimer, the term of this patent is extended or adjusted under 35 U.S.C. 154(b) by 698 days.

(21) Appl. No.: 10/763,815

(22) Filed: Jan. 22, 2004

(65) Prior Publication Data

US 2004/0175457 A1 Sep. 9, 2004

Related U.S. Application Data

(63) Continuation of application No. PCT/NL02/00484, filed on Jul. 18, 2002.

(30) Foreign Application Priority Data

Jul. 24, 2001 (EP) .................................. 01202833.8

(51) Int. Cl.
*A23K 1/18* (2006.01)

(52) U.S. Cl. .............. 424/442; 426/2; 426/53; 426/630; 426/635; 426/656; 426/657; 514/561; 514/562; 514/564; 514/565; 514/567

(58) Field of Classification Search ........................ None
See application file for complete search history.

(56) References Cited

U.S. PATENT DOCUMENTS

| | | | | |
|---|---|---|---|---|
| 3,949,090 A * | 4/1976 | Chalupa et al. | ............... | 514/599 |
| 4,241,082 A * | 12/1980 | Baba et al. | ..................... | 514/538 |
| 4,738,852 A * | 4/1988 | Watanabe et al. | .................. | 426/2 |
| 5,576,351 A * | 11/1996 | Yoshimura et al. | ........... | 514/565 |
| 5,910,482 A | 6/1999 | Yallampalli et al. | | |
| 6,737,262 B1 * | 5/2004 | Bolla et al. | ................. | 435/254.2 |
| 7,087,261 B2 * | 8/2006 | Chang et al. | .................. | 426/630 |
| 2002/0051844 A1 * | 5/2002 | Wilson et al. | ................. | 426/643 |

FOREIGN PATENT DOCUMENTS

| | | | |
|---|---|---|---|
| JP | 58043725 A | * | 3/1983 |
| WO | WO 97/34922 | | 9/1997 |
| WO | WO 03/009703 A1 | | 2/2003 |

OTHER PUBLICATIONS

Mahan, D. "Digestibility of soybean meals collected at four periods from a soybean processor (Cargill) in Ohio". Jan. 31, 2000. pp. 1-12 to 1-25. Online. Internet. Accessed Mar. 24, 2006 <http://www.nsrl.uiuc.edu/themes/soyswine/ss99Reports/Nutrient%20Compostion%20report.PDF>.*
Mahan, D. "Digestibility of soybean meals collected at four periods from a soybean processor (Cargill) in Ohio". Jan. 31, 2000. pp. 1-12 to 1-25. Online. Internet. Accessed Mar. 24, 2006. <http://www. nsrl. uiuc. edulthemeslsoyswinelss99ReportslNutrient%20Composition%20report. PDF>.*
Mahan, D. "Digestibility of soybean meals collected at four periods from a soybean processor (Cargill) in Ohio". Jan. 31, 2000. pp. 1-12 to 1-25. Online. Internet. Accessed Mar. 24, 2006. <http://www.nsrl.Nutrient%20Composition%2Oreport.PDF>.*
Morrison—Feeds & Feeding pp. 1048-1051,1058,1059,1064-1067,1138,1139; 1957.*
PCT International Search Report, PCT/NL02/00484, dated Sep. 25, 2002.
PCT International Preliminary Examination Report, PCT/NL02/00484, dated Oct. 27, 2003, 6 pages.
Easter et al., Arginine: A Dispensable Amino Acid for Postpubertal Growth and Pregnancy of Swine, Journal of Animal Science, 1974, pp. 1123-1128, vol. 39, No. 6.
Kirchgessner et al., Zum Einflu beta einer Argininzulage auf die Laktationsleistung von Sauen, J. Anim. Physiol. a. Anim. Nutr., 1991, pp. 38-44, vol. 66.
Pau et al., Arginine Deficiency During Gestation and Lactation in the Rat, Journal of Nutrition, 1981, pp. 184-193, vol. 111, No. 1.
Laspiur et al., Effect of dietary arginine supplementation and environmental temperature on sow lactation performance, Livestock Production Science, 2001, pp. 159-165, vol. 70.
Wu et al., Arginine nutrition in development, health and disease, Current Opinion in Clinical Nutrition and Metabolic Care, 2000, pp. 59-66, vol. 3.
Wu et al., Maternal Dietary Protein Deficiency Decreases Amino Acid Concentrations in Fetal Plasma and Allantoic Fluid of Pigs, Journal of Nutrition, 1998, pp. 894-902, vol. 128, No. 5.
Wu et al., Maternal Dietary Protein Deficiency Decreases Nitric Oxide Synthase and Ornithine Decarboxylase Activities in Placenta and Endometrium of Pigs During Early Gestation, Journal of Nutrition, 1998, pp. 2395-2402, vol. 128, No. 12.
Database WPI, Section Ch, Week 198316, Derwent Publications Ltd., London, GB; Class B05, AN 1983-38361K, XP002187488, Abstract and JP 58 043725.
Patent Abstracts of Japan, vol. 015, No. 167 (C-0827), Apr. 26, 1991, Feb. 15, 1991, Abstract and JP 03 035743.
Hazeleger et al., Effects of Progenos on placenta and fetal development in pigs, Abstract ASAS Midwest meeting 2007.
Ahmed et al., Angiogenesis and intrauterine growth restriction, Bailliere's Clinical Obstetrics and Gynaecology, 2000, pp. 981-998, vol. 14, No. 6. Berisha et al., Ovarian function in ruminants, Domestic Animal Endocrinology, 2005, pp. 305-317, vol. 29.
Geva et al., Role of vascular endothelial growth factor in ovarian physiology and pathology, Fertility and Sterility, Sep. 2000, pp. 429-438, vol. 74, No. 3.
Mayhew et al., Morphometric Evidence that Villous Development and Fetoplacental Angiogenesis are Comprised by Intrauterine Growth Restriction but not by Pre-eclampsia, Placenta, 2004, pp. 829-833, vol. 25.
Murohara et al., Nitric Oxide Synthase Modulates Angiogenesis in Response to Tissue Ischemia, J. Clin. Invest., pp. 2567-2578, vol. 101, No. 11.
Redmer et al, Effect of nutrient intake during pregnancy on fetal and placental growth and vascular development, Domestic Animal Endocrinology, 2004, pp. 199-217, vol. 27.
Reynolds et al., Animal Models of Placental Angiogenesis, Placenta, 2005, pp. 689-708, vol. 26.

(Continued)

*Primary Examiner* — Neil Levy
(74) *Attorney, Agent, or Firm* — TraskBritt

(57) ABSTRACT

The invention relates to products and methods for increasing the productivity in farming by improving the fertility of healthy farming mammals. More in particular, the invention relates to products and methods for improving the fertility of animals by reducing placental insufficiency. According to the invention, this is obtained by providing a product which is enriched in L-arginine. The arginine products of the invention may be applied to improve fertility, which may be used in improving the yield in viable offspring of an animal livestock.

6 Claims, No Drawings

OTHER PUBLICATIONS

Witzenbichler et al., Vascular Endothelial Growth Factor-C (VEGF-C/VEGF-2) Promotes Angiogenesis in the Setting of Tissue Ischemia, American Journal of Pathology, Aug. 1998, pp. 381-394, vol. 153, No. 2.

Wu et al., Board-invited Review: Intrauterine growth retardation: Implications for the animal sciences; J. Anim. Sci, 2006, pp. 2316-2337, vol. 84.

Zimmermann et al, Vascular endothelial growth factor receptor 2-mediated angiogenesis is essential for gonadotropin-dependent follicle development, The Journal of Clinical Investigation, Sep. 2003, pp. 659-669, vol. 112, No. 5.

Zygmunt et al., Angiogenesis and vasculogenesis in pregnancy, European Journal of Obstetrics & Gynecology and Reproductive Biology, 2003, pp. S10-S18, vol. 110.

Johnston, L., Gestating Swine Nutrient Recommendations and Feeding Management, National Swine Nutrition Guide, Apr. 2010, pp. 108-122.

Patterson et al., The effect of gilt age at first estrus and breading on third estrus on sow body weight changes and long-term reproductive performance, J Anim Sci, Jun. 15, 2010, pp. 2500-2513, American Society of Animal Science.

Schenkel et al., Body reserve mobilization during lactation in first parity sows and its effect on second litter size, Livestock Science, 2010, pp. 165-172, vol. 132.

Van Der Lende et al., Effect of oral L-arginine supplementation of sows during two stages of pregnancy on litter size and birth weight, Final Trial Report of Project High Prolific Sow, Nov. 2002, pp. 1-9.

Ramaekers et al., Abstract, Progenos in sows increases number of piglets born, J. Anim. Sci., 2006, p. 394, vol. 84.

Nutrient Requirements of Swine, Tenth Revised Edition, 1998, National Academy of Sciences.

Hazeleger et al., Influence of Nutritional Factors on Placental Growth and Piglet Imprinting, pp. 309-327.

Hazeleger et al., Effects of Progenos on Placental and Fetal Development in Pigs, Abstract, Journal compilation, 2007, p. 135.

Malamitsi-Puchner et al., Vascular endothelial growth factor and placenta growth factor in intrauterine growth-restricted fetuses and neonates. Mediators of Inflammation 2005, pp. 293-297, vol. 5.

Regnault et al., The relationship between transplacental O2 diffusion and placental expression of PlGF, VEGF and their receptors in a placental insufficiency model of fetal growth restriction. Journal of Physiology, 2003, pp. 641-656, vol. 550.

Tamanini et al., Angiogenesis in developing follicle and corpus luteum. Reproduction in Domestic Animals, 2004, pp. 206-216, vol. 39.

Wallace et al., Investigating the cause of low birth weight in contrasting ovine paradigms. Journal of Physiology, 2005, pp. 19-26, vol. 565.

* cited by examiner

DIETARY MODIFICATIONS TO IMPROVE FERTILITY

CROSS-REFERENCE TO RELATED APPLICATION

This application is a continuation of PCT International Patent Application No. PCT/NL/02/00484, filed on Jul. 18, 2002, designating the United States of America, and published, in English, as PCT International Publication No. WO 03/09703 A3 on Feb. 6, 2003, the contents of the entirety of which is incorporated by this reference.

TECHNICAL FIELD

The invention relates, generally, to products and methods for increasing the productivity in farming by improving the fertility of healthy farming mammals, in particular pigs. More in particular, the invention relates to products and methods for improving the fertility of mammals by improvement of placentation in an animal, in particular by improvement of placentation which results from improved placental angiogenesis.

BACKGROUND

Placental insufficiency is the main reason for fetal mortality, stillbirth, and early neonatal mortality. This is particularly a problem in farming, where a high production of viable offspring is desired. Healthy European pigs, for example, produce an average of about 12 piglets per litter, while the average loss is approximately 1 piglet per litter due to late fetal mortality, 1 piglet per litter due to stillbirth and 1 piglet per litter due to early neonatal mortality.

The term "fertility" as used in the present application and claims, is to be understood in a broad sense, viz, this term not only covers a decreased embryonic and fetal mortality, but also a decrease in perinatal and early neonatal losses of offspring, as well as a decrease in within-litter variation in development at birth. The improved fertility is reflected e.g. in an increased production of offspring for farming animals, such as pigs, or in an increased chance for viable offspring in case of animals, such as bovine or equine species or humans, which generally give birth to only a single individual per parturition.

Perinatal mortality is defined as the mortality within a few days around birth, viz, all mortality within a day or two before parturition, mortality during and immediately after parturition and all early-neonatal mortality.

In a commercial pig-breeding unit, the overall profitability rises with an increasing number of piglets weaned per sow per year. The latter depends on age at first farrowing, breeding life expectancy, the prolificacy of the sows in the herd (i.e. litter size), number of farrowings per sow per year and perinatal and pre-weaning mortality rate. Considering the fact that for each weaned piglet more than two oocytes were initially fertilized, it is evident that piglet mortality during pregnancy, parturition and lactation imposes a substantial loss to the farmer.

In order to prevent fetal mortality and thus improve the fertility of animals, it has inter alia been suggested to increase uterine capacity by genetic selection, as described for pigs by Leymaster et al. (Proceedings of the 3rd World Congress on Genetics Applied to Livestock Production, XI, (1986) 209-214) or by selecting for increased placental efficiency (Ford, Journal of Reproduction and Fertility, Supplement 52 (1997) 165-176; Wilson et al. Journal of Animal Science, 77 (1999) 1654-1658). Although it is possible to select for uterine capacity, this route requires considerable time and effort, and is particularly difficult because uterine capacity is not a simple trait to measure.

DISCLOSURE OF THE INVENTION

The present invention provides for methods and products for improving the fertility of animals, which do not have the above-mentioned disadvantages, viz, which are, amongst others, relatively simple to apply using existing facilities. It was found that a specific dietary modification, which involves providing in the animals a dosage of arginine, preferably at specific periods during gestation, which dosage is substantially higher than normal dosages, may improve the fertility of the animals by reducing placental insufficiency. The invention is particularly suitable when applied to gestating sows. Normally animal feed contains about 5-15 gram arginine per kg feed. Under normal feeding conditions, this amounts to a daily dosage of about 65-200 mg arginine per kg body weight ($k_{gBw}$) of the fed animal. Therefore, in a first aspect, the invention relates to an animal feed suitable for feeding a gestating animal, which animal feed is enriched in arginine, such that a daily dosage of more than 200 mg arginine per kg body weight of said animal is provided upon feeding. Preferably this dosage is more than 400 mg/($k_{gBw}$ day).

Without wishing to be bound to theory, it is assumed that arginine improves angiogenesis and thus the vascularization of the placenta, by which the development of embryos and fetuses in the uterus is improved. As a result, a better placentation is observed in the animal by which a higher fertility and/or production of more viable offspring is obtained.

The effect of arginine on the animal's fertility in general and especially that of swine, is particularly surprising in view of a report by the National Research Council (U.S.) entitled "Nutrient Requirements of Swine" (National Academy Press (1998, 10th rev. ed.), which is a standard reference for swine breeders. According to this report, swine during pregnancy can synthesize arginine at a rate sufficient to meet most or all of their needs. Accordingly, in the ideal ratio of amino acids for maintenance listed in this report, the value of arginine is negative to reflect the fact that arginine synthesis can satisfy all the maintenance needs. The daily arginine requirement of gestating sows (both on true and apparent ileal digestible basis) is listed as 0 g/day, for sows having a body weight at breeding of 175 kg or more. Furthermore, according to this report, excessive supplements of arginine are even undesirable, since it can reduce feed intake and growth rate.

Wu et al. (J. Nutr. 128 (1998) 2395-2402) studied the results of dietary protein deficiencies and noted that arginine concentrations in placenta and endometrium were lower in protein-deficient gilts. Feeding of arginine is, however, not disclosed, nor suggested in this publication.

Furthermore, Wu et al. in Curr. Opin. Clin. Nutr. Metab. Care 3 (2000) 59-66, describe that L-arginine administration is beneficial in improving reproductive functions. Although it is suggested in this publication that L-arginine administration may be a means to prevent preterm birth in women, this is attributed to nitric oxide (NO) inhibiting uterine contractility and maintaining uterine quiescence as a result of the vasodilatation effect of NO, leading to increased blood flow. The effect of arginine on the angiogenesis and thus the vascularization of the placenta, is not disclosed nor suggested. All effects mentioned by Wu et al. (2000) in relation to female fertility thus relate to the use of arginine in late gestation.

The invention is applicable to mammals in general, including humans. In the description below, the invention will mainly be illustrated with reference to pigs, but is not limited thereto.

In the present invention, the focus is on the possibility to use arginine in critical periods of placental angiogenesis to stimulate blood vessel formation. Thus, the present invention provides for selective induction of extra angiogenesis for fetuses growing under ischemic conditions, viz, in conditions where the supply of oxygen and nutrients are limited. As a result, improved fertility, as defined above, is obtained in accordance with the present invention.

Preferably, the animal feed of the present invention is enriched in arginine, such that a dosage of 200-1300 mg/($k_{gBw}$ day) arginine is provided upon feeding, more preferably 250-1000 mg/($k_{gBw}$ day), most preferably 250-650 mg/($k_{gBw}$ day).

The desired concentrations of arginine in the food, required to obtain the suitable dosages of arginine are most conveniently obtained by using a premix. Such a premix may comprise other dietary supplements and may be mixed with conventional animal feed to obtain the animal feed of the invention. A premix in accordance with the present invention may contain typically 1 to 50 wt. % arginine, but this depends mainly on the amount of premix that is to be used to provide the final feed composition. All amounts expressed in weight ratios in the present description and claims are calculated on a dry matter basis. The amount of premix used varies usually between 0.1 to 20% based on the total weight of the mixed feed.

A feed or a premix for a feed according to the present invention is suitably prepared by supplementing arginine, preferably synthetic arginine, to an animal feed (or premix therefore). Such a feed, which is particularly suitable for gestating sows, may contain added arginine in such an amount that the total arginine/lysine (w/w) content is higher than 1.5, preferably higher than 1.75, preferably higher than 2.0, more preferably higher than 2.25. More preferably, one or more other amino acids are present in the feed in the following ranges (expressed relative to lysine (w/w)).

|  | Preferred | More Preferred |
|---|---|---|
| Total methionine + cysteine | >0.55 | 0.55-0.70 |
| Threonine | >0.60 | 0.60-0.80 |
| Tryptophan | >0.15 | 0.15-0.25 |

Typically, the amounts (relative to lysine (w/w)) for methionine+cysteine, threonine and tryptophan are about 0.60, about 0.70 and about 0.18, respectively. These amounts of amino acids are particularly suitable to provide a feed which covers the requirements as to maintenance, growth and reproduction of gestating sows.

Preferably, the total amount of lysine in the feed for gestating sows is below 0.8 wt. %, more preferably in the range of 0.5 to 0.75 wt %. Although higher amounts of lysine are possible, this is generally not necessary, and thus not preferred for economical reasons.

The arginine, as well as the other amino acids, may be added in the form of the pure amino acid compound (typically synthetically obtained). It is also possible to use polypeptides, including proteins, which are rich in the desired amino acid.

Furthermore, the feed according to the present invention, in particular when used as feed for (gestating) sows, preferably comprises calcium. The concentration of calcium is preferably below 1.0 wt %, preferably below 0.8 wt. %.

The present invention is also directed to a method for increasing the breeding productivity of an animal livestock comprising feeding at least one gestating animal of said livestock with 200-1300 mg arginine per kg body weight of said animal. Preferably 200-1300 mg/($k_{gBw}$ day) is fed, more preferably 250-650 mg/($k_{gBw}$ day).

By feeding the animal feed in accordance with the invention, a significant increase in the production of animals is observed. Moreover, the within-litter variation in development at birth (e.g. birth weight) decreases significantly, thus contributing to an improved fertility as defined hereinabove. For pigs, the improvement obtained according to the invention may be from one up to three piglets per litter, corresponding to an increase in production of 8%, or even more. For other animals, bearing usually only a single offspring at a time, similar results may be obtained, that is to say, a fertility which is significantly improved with respect to the same non-treated animals, as reflected by an improved chance for viable offspring.

Furthermore, it has been found that the method of the invention is very successfully carried out by feeding the animal in one of the so-called critical periods. It was found that normally during gestation, animals such as pigs, go through at least three of such critical phases, which are characterized by a dramatic drop in embryo or fetus count. For pigs, the initial (i.e. at day 0 of gestation, directly after fertilization) number of viable embryos is about 17. After about 35-40 days of gestation, this number drops considerably. This period corresponds to the period of embryo implantation and is preceded by a period of rapid placenta growth, which takes place at about day 14-30. In the period which follows the embryo implantation, the fetal count is more or less stable. Then, at day 55-75 again a considerably drop in viable fetuses is observed. This period corresponds to the period wherein the placenta reaches its maximum size. After this period the fetal count is stable again. Finally, at about day 100, which for pigs corresponds to the so-called perinatal period, again a drop in viable fetuses is observed, which is believed to be the result of uterine crowding.

In a preferred embodiment of the method of the invention, the feeding takes place in one or more of the above-mentioned critical periods. Thus, it is preferred to carry out the feeding during the period of embryo implantation in the gestating animal. It is also preferred to carry out the feeding of the animal in accordance with the present invention during the period of placenta growth, which coincides with embryo implantation.

For pigs, this means that the feeding in accordance with the invention is carried out during days 14-30 and days 105-115 of gestation.

Arginine obtained from plant and animal proteins is predominantly present in the L-isomeric form. Although the D-isomer may be used as well, it is not preferred from a practical point of view because the low commercial availability of D-arginine. The arginine used in accordance with the present invention may be in its pure form, which may be obtained commercially e.g. in the form of crystals. It is also possible, and sometimes preferred for economic considerations, to provide the arginine in the form of proteins or other polypeptides, which are particularly rich in arginine. An example of such an arginine rich product is sesame seed. When using arginine in a proteinaceous or polypeptide form, care must be taken, however, that the amount of nitrogen introduced in the diet is not too high, since this may cause environmental problems.

The method, the animal feed and the premix according to the present invention, may be applied to various animals, in particular mammals. Preferred mammals are those that are agriculturally interesting, especially those selected from bovine species, equine species, porcine species, and ovine species. Also feeding to pet animals is envisaged.

Arginine or a product which is relatively rich in arginine, such as the above-mentioned sesame seeds, may also be used in the preparation of a food supplement for the reduction of placenta insufficiency of an animal. Such a food supplement may be administered to animals, including humans, to improve fertility.

The present invention will be illustrated by the following illustrative Example.

EXAMPLE

Oral L-arginine Supplementation of Sows During Pregnancy

Material and Methods

The experiment was performed with 197 sows that had already produced at least one litter. Sows in the control group (n=95) received a normal diet during gestation. Sows in the L-arginine group (n=102) received a normal diet from insemination until day 13 of pregnancy, an L-arginine supplemented diet from day 14 until day 31, again the control diet from day 32 until day 104 and again the L-arginine supplemented diet from day 105 until farrowing.

The L-arginine supplemented diet was the same as the control diet, except for the addition of 10 g L-arginine per kg.

Results

The farrowing rate in the control group and L-arginine group was 74% (70/95) and 85% (87/102), respectively.

After correction for the effect of parity on litter size, the sows in the L-arginine group had significantly more piglets per litter than the sows in the control group (Table 1). The piglets in the L-arginine group had on average a somewhat lower birth weight (not significant) but this was completely due to the fact that the litters were larger in this group. After correction for litter size, the birth weight of the piglets was not different between both groups.

TABLE 1

The effect of L-arginine supplementation during critical periods of prenatal development on litter size and birth weight.

|  | Control group | L-arginine group |
|---|---|---|
| Number of litters | 70 | 87 |
| Total number born + mummies | 11.77 ± 0.33 | 12.74 ± 0.31* |
| Total number born (TNB) | 11.75 ± 0.33 | 12.69 ± 0.31* |
| Number born alive (NBA) | 10.92 ± 0.32 | 11.77 ± 0.30+ |
| Birth weight TNB, g | 1604 ± 29 | 1563 ± 27 |
| Birth weight TNB corrected for LS, g | 1576 ± 25 | 1578 ± 23 |
| Birth weight NBA, g | 1627 ± 29 | 1584 ± 27 |
| Birth weight NBA corrected for LS, g | 1603 ± 26 | 1597 ± 24 |

*$p < 0.05$;
+$p = 0.055$

Stillborn piglets were found in 33 sows of the control group (47.1%) and in 41 sows of the L-arginine group (47.1%). The average number of stillborn piglets in litters with stillborn piglets was 1.91±0.25 and 1.86±0.22, respectively (not significantly different).

From these results, it follows that oral arginine supplementation of sows during critical periods during pregnancy has a positive effect on farrowing rate.

Furthermore, arginine supplementation of sows during critical periods during pregnancy has a significant effect on litter size, both total number born and number born alive (±1 piglet extra).

Also, oral arginine supplementation of sows during critical periods during pregnancy has no effect on the percentage of litters with stillborn piglets and no effect on the number of stillborn piglets in litters with stillborn piglets.

What is claimed is:

1. A feed or food supplement comprising a premix containing arginine in a sufficient amount, upon mixing with feed, to produce an animal feed for feeding a gestating sow, wherein the animal feed has an amount of lysine, methionine, cysteine, threonine, tryptophan, and arginine, and wherein the amount consists essentially of lysine and the following in an amount relative to the amount of lysine (w/w) in the following ranges:

| | |
|---|---|
| total methionine + cysteine: | >0.55; |
| threonine: | >0.60; |
| tryptophan: | >0.15; and |
| arginine: | >2.25, | wherein a daily dosage of more than 200 mg arginine per kg body weight of the gestating sow is provided upon feeding the gestating sow with the animal feed, and wherein the premix contains from 1.25 to 10 wt % arginine.

2. A method for increasing the breeding productivity of a gestating sow, the method comprising:
providing the feed of claim 1 in an amount so as to provide an amount of the amino acids lysine, methionine, cysteine, threonine, tryptophan, and arginine to the gestating sow in the animal feed, wherein the amount consists essentially of lysine and the following amino acids in an amount relative to the amount of lysine (w/w) in the following ranges:

| | |
|---|---|
| total methionine + cysteine: | >0.55; |
| threonine: | >0.60; |
| tryptophan: | >0.15; and |
| arginine: | >1.5, | so as to provide the gestating sow a daily dosage of from more than 200 to 1300 mg arginine per kg body weight and thus increase the gestating sow's breeding productivity, wherein the animal feed contains from 1.25 to 10 wt % arginine.

3. A method of increasing the breeding productivity of a pig, the method comprising:
feeding a feed or food supplement to the pig at days 14-30 of the pig's gestation,
wherein the feed or food supplement comprises a premix containing arginine in a sufficient amount, upon mixing with feed, to produce an animal feed for feeding a gestating sow, wherein the animal feed has an amount of lysine, methionine, cysteine, threonine, tryptophan, and arginine, and wherein the amount consists essentially of lysine and the following in an amount relative to the amount of lysine (w/w) in the following ranges:

| | |
|---|---|
| total methionine + cysteine: | >0.55; |
| threonine: | >0.60; |

| | |
|---|---|
| tryptophan | >0.15; and |
| arginine: | >2.25, | wherein a daily dosage of more than 200 mg arginine per kg body weight of the gestating sow is provided upon feeding the gestating sow with the animal feed, and wherein the premix contains from 1.25 to 10 wt % arginine.

4. The method according to claim 3, wherein the feeding also takes place at days 105-115 of the pig's gestation.

5. A method of increasing the breeding productivity of a pig, the method comprising:
   providing a feed or food supplement in a diet to the pig at days 14-30 of the pig's gestation,
   wherein the feed or food supplement comprises a premix containing arginine in a sufficient amount, upon mixing with feed, to produce an animal feed for feeding a gestating sow, wherein the animal feed has an amount of lysine, methionine, cysteine, threonine, tryptophan, and arginine, and wherein the amount consists essentially of lysine and the following in an amount relative to the amount of lysine (w/w) in the following ranges:

| | |
|---|---|
| total methionine + cysteine: | >0.55; |
| threonine: | >0.60; |
| tryptophan: | >0.15; and |
| arginine: | >2.25, | wherein a daily dosage of more than 200 mg arginine per kg body weight of the gestating sow is provided upon feeding the gestating sow with the animal feed, and wherein the premix contains from 1.25 to 10 wt % arginine.

6. The method according to claim 5, wherein the diet is also provided at days 105-115 of the pig's gestation.

* * * * *